US010802819B2

United States Patent
Lowe et al.

(10) Patent No.: US 10,802,819 B2
(45) Date of Patent: Oct. 13, 2020

(54) BINARY IMAGE DIFFERENTIAL PATCHING

(71) Applicant: Huawei Technologies Co., Ltd., Shenzhen (CN)

(72) Inventors: Christopher Kevan Lowe, Cambridge (GB); Gengshi Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/362,325

(22) Filed: Mar. 22, 2019

(65) Prior Publication Data
US 2019/0220272 A1 Jul. 18, 2019

Related U.S. Application Data

(63) Continuation of application No. PCT/EP2016/072753, filed on Sep. 23, 2016.

(51) Int. Cl.
| | |
|---|---|
| H04L 29/06 | (2006.01) |
| G06F 9/44 | (2018.01) |
| G06F 9/445 | (2018.01) |
| G06F 11/00 | (2006.01) |
| G06F 15/16 | (2006.01) |

(Continued)

(52) U.S. Cl.
CPC ............ *G06F 8/658* (2018.02); *G06F 3/0604* (2013.01); *G06F 3/065* (2013.01); *G06F 3/0659* (2013.01); *G06F 3/0673* (2013.01); *G06F 8/654* (2018.02)

(58) Field of Classification Search
CPC ...... G06F 16/27; G06F 16/1844; G06F 8/658; G06F 11/3612; G06F 11/362;

(Continued)

(56) References Cited

U.S. PATENT DOCUMENTS

| | | | |
|---|---|---|---|
| 7,353,284 B2 | 4/2008 | Agnoli et al. | |
| 8,468,516 B1* | 6/2013 | Chen | G06F 8/656 |
| | | | 717/170 |

(Continued)

FOREIGN PATENT DOCUMENTS

| | | |
|---|---|---|
| CN | 1482516 A | 3/2004 |
| CN | 1499447 A | 5/2004 |

(Continued)

OTHER PUBLICATIONS

Kim et al., Remote Progressive Firmware Update for Flash-Based Networked Embedded Systems, 6 pages (Year: 2009).*

(Continued)

*Primary Examiner* — Thuy Dao
(74) *Attorney, Agent, or Firm* — Leydig, Voit & Mayer, Ltd.

(57) ABSTRACT

A patch generator for generating a patch that expresses a series of updates to a source image that will transform the source image into a target image. The patch generator compares sections of the target image, in turn, with respective versions of the source image. The patch generator generates the series of updates for the patch in dependence on the comparisons between the sections of the target image and the respective versions of the source image. Comparing each section of the target image with versions of the source image that are expected to be stored by the device during the process of implementing the patch allows the possibility that the device could change the source image in its memory while it implements the patch.

9 Claims, 5 Drawing Sheets

(51) Int. Cl.
*G06F 8/658* (2018.01)
*G06F 8/654* (2018.01)
*G06F 3/06* (2006.01)

(58) Field of Classification Search
CPC .......... G06F 21/125; G06F 21/14; G06F 8/71;
G06F 16/2365; G06F 8/65; G06F 8/60;
G06F 8/656; G06F 8/61; G06F 8/62;
G06F 8/63; G06F 8/654; G06F 8/0604;
G06F 3/604; G06F 3/065; G06F 3/0659;
G06F 3/0673; Y10S 707/99953; Y10S
707/99945; Y10S 707/99942; Y10S
707/99933; B41J 2202/20; B41J 2/04505;
B41J 2/04508; B41J 2/0451; B41J
2/04528; H04L 63/1441
See application file for complete search history.

(56) References Cited

U.S. PATENT DOCUMENTS

| | | | |
|---|---|---|---|
| 9,053,107 | B1 | 6/2015 | Le |
| 9,780,938 | B2 * | 10/2017 | Athalye ................ H04L 5/0055 |
| 10,203,947 | B2 * | 2/2019 | Shiraishi ............... G06F 11/302 |
| 2004/0255339 | A1 | 12/2004 | Agnoli et al. |
| 2005/0071371 | A1 | 3/2005 | Woodhouse |
| 2005/0281469 | A1 | 12/2005 | Anderson et al. |
| 2011/0093841 | A1 | 4/2011 | Meller et al. |
| 2011/0179406 | A1 | 7/2011 | Ohama |
| 2013/0104119 | A1 * | 4/2013 | Matsuo ..................... G06F 8/65 717/173 |
| 2014/0101096 | A1 | 4/2014 | Pfeifle et al. |
| 2014/0281125 | A1 | 9/2014 | Meller et al. |
| 2015/0082294 | A1 * | 3/2015 | Tong ....................... G06F 8/654 717/170 |
| 2017/0277517 | A1 * | 9/2017 | Petitgrand ................ G06F 8/65 |

FOREIGN PATENT DOCUMENTS

| | | |
|---|---|---|
| CN | 102033728 A | 4/2011 |
| CN | 103294439 A | 9/2013 |
| CN | 103377702 A | 10/2013 |
| CN | 104424872 A | 3/2015 |
| CN | 105046701 A | 11/2015 |
| CN | 105913065 A | 8/2016 |
| EP | 1855197 A1 | 11/2007 |
| EP | 3038017 A1 | 6/2016 |
| WO | 2010017326 A1 | 2/2010 |

OTHER PUBLICATIONS

Kim et al., Energy-Efficient Progressive Remote Update for Flash-Based Firmware of Networked Embedded Systems, 26 pages (Year: 2010).*
Chen et al.,"Understanding Intrinsic Characteristics and System Implications of Flash Memory based Solid State Drives," Sigmetrics/Performance'09:Proceedings of the 2009 Joint International Conference on Measurementand Modeling of Computer Systems, Seattle Washington, XP058113688, pp. 181-192 (Jun. 15-19, 2009).
Percival, "Naive Differences of Executable Code," pp. 1-3 (2003).
CN/201680089463.7, Office Action/Search Report, dated Jul. 21, 2020.
Gao et al., "Infrared Patch-Image Model for Small Target Detection in a Single Image," IEEE Transactions on Image Processing, vol. 22, No. 12, pp. 4996-5009, Institute of Electrical and Electronics Engineers, New York, New York (Dec. 2013).
Xinyi et al., "Segmentation of Foreign Fibres Based on the Geometric Features," Journal of Agricultural Mechanization Research, total 4 pages (2010). With English abstract.
Yuan et al., "A New Method of Gray Level Corner Detection Based on Multiscale Image," Signal Processing, vol. 14, total 6 pages (Dec. 1998). With English abstract.

* cited by examiner

BINARY IMAGE DIFFERENTIAL PATCHING

CROSS-REFERENCE TO RELATED APPLICATIONS

This application is a continuation of International Application No. PCT/EP2016/072753, filed on Sep. 23, 2016, the disclosure of which is hereby incorporated by reference in its entirety.

TECHNICAL FIELD

This disclosure relates to techniques for generating patches that represent software updates and to techniques for updating software using those patches.

BACKGROUND

Software can be updated remotely by transmitting replacement code to devices that have the original code. The receiving device then overwrites its copy of the old code with the replacement code. Software updates can often be large, so it is preferable to compress the replacement code before it is transmitted in order to use the available bandwidth more efficiently. Compressing the replacement code prior to transmission typically achieves a reduction of around 50% in the amount of data that is transmitted.

One technique that achieves a greater reduction in the amount of data that has to be transmitted over the air interface than compression alone is BSDiff. This technique recognises that much of the replacement code will often be the same as the old code. Therefore, rather than transmitting a whole image, this technique generates a patch file for transmission over the air interface that encodes the differences between the replacement code and the old code. This technique makes more efficient use of the available bandwidth than compression alone. BSDiff can achieve a reduction of up to 90% in the amount of data that is transmitted compared with the uncompressed replacement code. The device constructs the replacement image by applying the differences specified in the patch to its stored version of the code to gradually build its own copy of the replacement code. This approach is not ideal for constrained devices with small flash memories because it requires the device to store the new image that it is constructing at the same time that it is still storing the original software image.

It is an object of the disclosure to provide techniques for generating and implementing patch files that are able to be implemented by memory-constrained devices.

The foregoing and other objectives are achieved by the features of the independent claims. Further implementation forms are apparent from the dependent claims, the description and the figures.

SUMMARY

According to a first aspect, a patch generator is provided for generating a patch that expresses a series of updates to a source image that will transform the source image into a target image. The patch generator is configured to compare sections of the target image, in turn, with respective versions of the source image. The patch generator is configured to determine the respective versions of the source image by assuming that a device for which the patch is intended will implement the patch by progressively updating a source image that it stores and by determining the respective versions of the source image to be versions of the source image that the patch generator expects the device to be storing when it implements each update of the series of updates expressed by the patch. The patch generator is configured to compare each section of the target image with a respective version of the source image that the patch generator expects the device to be storing at the point when it implements an update corresponding to that section of the target image in the patch. The patch generator generates the series of updates for the patch in dependence on the comparisons between the sections of the target image and the respective versions of the source image. Comparing each section of the target image with versions of the source image that are expected to be stored by the device during the process of implementing the patch allows the possibility that the device could change the source image in its memory while it implements the patch. This can reduce memory usage at the device, by removing the need for the device to keep source image unchanged in memory while it constructs its replacement.

The patch generator may be configured to generate the patch to express the update as a series of progressive changes to the source image that will transform it into the target image. Expressing the update as a series of progressive changes simplifies the operation of generating the patch, by making it straightforward to predict what version of the source image will be in the memory of the device at each point in the process of implementing the patch.

The patch generator may be configured to compare a section of the target image to the source image by searching the version of the source image that is expected to be stored by the device for a candidate section and determining how that candidate section would have to be changed for it to replicate the section of the target image. This reduces the size of the patch by allowing the software update to be expressed as a series of changes to what the device already has stored in its memory.

The patch generator may be configured to generate the patch to include an instruction that defines how to change the candidate section to replicate the section of the target image. This enables the device that receives the patch to construct its own version of the target image.

The patch generator may be configured to compare a section of the target image to a stored version of the source image. It may determine how the stored version of the source image could be changed to replicate the section of the target image. It may then update the stored version of the source image in accordance with the determined change, the updated source image thereby becoming the stored version of the source image against which subsequent sections of the target image are compared. This enables the patch generator to straightforwardly keep track of the version of the source image that can be expected to be stored by the device at different points in the patch.

The patch generator may be configured to identify a size of a buffer associated with a memory of a device for which the patch is intended and delay updating the stored version of the source image in dependence on the identified buffer size. This enables the patch generator to take account of a typical programming cycle at the device, where updates to the flash memory are stored in a buffer before being written to memory. An example of this is NAND Flash, where a block of flash is erased in its entirety before being programmed with the target image from the buffer.

The patch generator may be configured to delay updating the stored version for a time that is dependent on a time that is expected to elapse between the device storing an updated section of the source image in the buffer and the device writing that updated section of the source image to the memory. This enables the patch generator to account for any factor that is expected to cause a delay at the device between implementing an update in the patch and writing the result of that update back to memory.

The patch generator may be configured to identify if the target image is larger than the source image and, if so, reverse an order in which sections of the target image are compared with a version of the source image compared with when the target image is not larger than the source image. This helps the patch generator to minimise the size of the patch, irrespective of the relative sizes of the target and source images.

According to a second aspect, a method for generating a patch is provided that expresses a series of updates to a source image that will transform it into a target image. The method comprises comparing sections of the target image, in turn, with respective versions of the source image. The respective versions of the source image are determined by assuming that a device for which the patch is intended will implement the patch by progressively updating a source image that it stores and determining the respective versions of the source image to be versions of the source image that the device is expected to be storing when it implements each update of the series of updates expressed by the patch. Comparing each section of the target image with a respective version of the source image comprises comparing that section of the target image with the respective version of the source image that the device is expected to be storing at the point when it implements an update corresponding to that section of the target image in the patch. The method also comprises generating the series of updates for the patch in dependence on the comparisons between the sections of the target image and the respective versions of the source image.

According to a third aspect, a non-transitory machine readable storage medium having stored thereon processor executable instructions is provided for implementing a method for generating a patch that expresses a series of updates to a source image that will transform it into a target image. The instructions implement a method that comprises comparing sections of the target image, in turn, with respective versions of the source image. The respective versions of the source image are determined by assuming that a device for which the patch is intended will implement the patch by progressively updating a source image that it stores and determining the respective versions of the source image to be versions of the source image that the device is expected to be storing when it implements each update of the series of updates expressed by the patch. Comparing each section of the target image with a respective version of the source image comprises comparing that section of the target image with the respective version of the source image that the device is expected to be storing at the point when it implements an update corresponding to that section of the target image in the patch. They also implement a method that comprises generating the series of updates for the patch in dependence on the comparisons between the sections of the target image and the respective versions of the source image.

According to a fourth aspect, a program manager is provided that is configured to receive a patch that expresses an update to a source image that will transform that source image into a target image. The program manager is configured to read a section of the source image that is to be updated from a memory in which the source image is stored. It updates that section of the source image in accordance with the patch and writes the updated section back to the memory by overwriting at least part of the stored source image. Overwriting the source image enables the program manager to replicate the target image "in situ", which uses less memory than constructing the target image separately.

The program manager may be configured to receive a patch that expresses the update as a series of changes to one or more sections of the source image that are to be undertaken in a particular order. The program manager may be configured to read and update the one or more sections of the source image in accordance with that order. This ensures that the program manager is applying each update in the patch to the correct version of the source image, so that the reconstruction process stays consistent with the process that was used to generate the patch.

The program manager may be configured to write the updated section back to the memory by overwriting a part of the stored source image that corresponds to that section. This keeps the version of the source image that the program manager is accessing to implement the patch consistent with the versions that were used to generate the patch.

According to a fifth aspect, a method is provided that comprises receiving a patch that expresses an update to a source image that will transform it into a target image. The method comprises reading a section of the source image that is stored in a memory and updating that section of the source image in accordance with the patch. It also comprises writing the updated section back to the memory by overwriting at least part of the stored source image.

According to a sixth aspect, a non-transitory machine readable storage medium having stored thereon processor executable instructions is provided for implementing a method that comprises receiving a patch that expresses an update to a source image that will transform it into a target image. The instructions implement a method that comprises reading a section of the source image that is stored in a memory. They also implement a method that comprises updating that section of the source image in accordance with the patch and writing the updated section back to the memory by overwriting at least part of the stored source image.

BRIEF DESCRIPTION OF DRAWINGS

The present disclosure will now be described by way of example with reference to the accompanying drawings. In the drawings.

DESCRIPTION OF EMBODIMENTS

Figure 1:
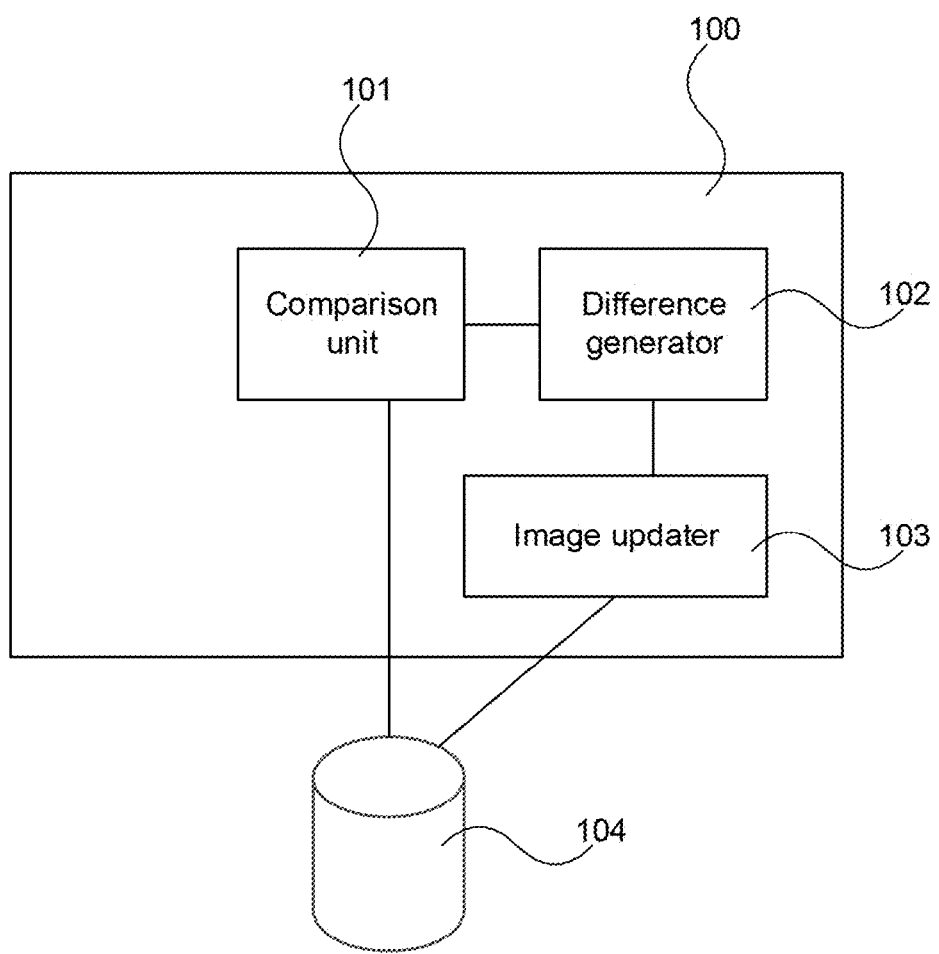
FIG. 1 shows an example of a patch generator.

An example of a patch generator 100 is shown in FIG. 1. The patch generator is shown illustratively as comprising a number of functional blocks. In practice the patch generator is likely to be implemented using software. Therefore, the patch generator may be implemented wholly or partly by a processor acting under software control. The functional blocks shown in FIG. 1 may therefore be embodied by a single computer program stored on a non-transitory machine-readable storage medium. In other implementations, the patch generator of FIG. 1 could be embodied by a number of separate computer programs. FIG. 1 is not intended to define a strict division between different programs, procedures or functions in software. In one implementation, the patch generator may form the patch generation tool of a server tasked with generating firmware for a number of distributed devices.

In other implementations, some or all of the functions of the patch generator could be implemented wholly or partly in hardware.

The patch generator (100) comprises a number of functional blocks including a comparison unit 101, a difference generator 102 and an image updater 103, with at least the comparison unit and the image updater having access to a memory 104. The operations of these functional blocks will be described with reference to FIG. 2, which provides an overview of a patch generation technique.

The patch generator (100) is configured to generate a patch. The patch comprises a series of instructions for a "device" (which could also be a component part of a larger device, e.g. a single chip) that is separate from the patch generator. Essentially the patch is a file that instructs the device how to update its software. The replacement software is termed the "target image" with the original code stored at the device termed the "source image". The image may be any program, procedure or function in the device's software, or any part thereof. The patch describes how the device can update its source image to transform it into the target image.

The technique for generating the patch commences in step S201, when the comparison unit 101 compares a section of the target image with the source image. Both the source image and the target image are stored in a memory 104. In most implementations the comparison unit will search the source image for a section that closely resembles the target image section, so as to minimise the number of differences that will have to be expressed in the patch. The difference generator 102 identifies any differences between the target image section and the source image section identified in step S201, in order to determine how the source image section would have to be updated for it to replicate the target image section (step S202). These differences are then added to the patch (step S203).

In step S204, the update that was determined in the previous steps is then applied to the version of the source image that is stored by memory 104. Thus the next iteration of the method compares the next target image section with the updated source image rather than the original source image. The patch generator therefore generates the patch using a "reference" source image that changes each time that the patch generator determines that an alteration should be made to the source image if it is to be transformed into the target image.

Figure 2:
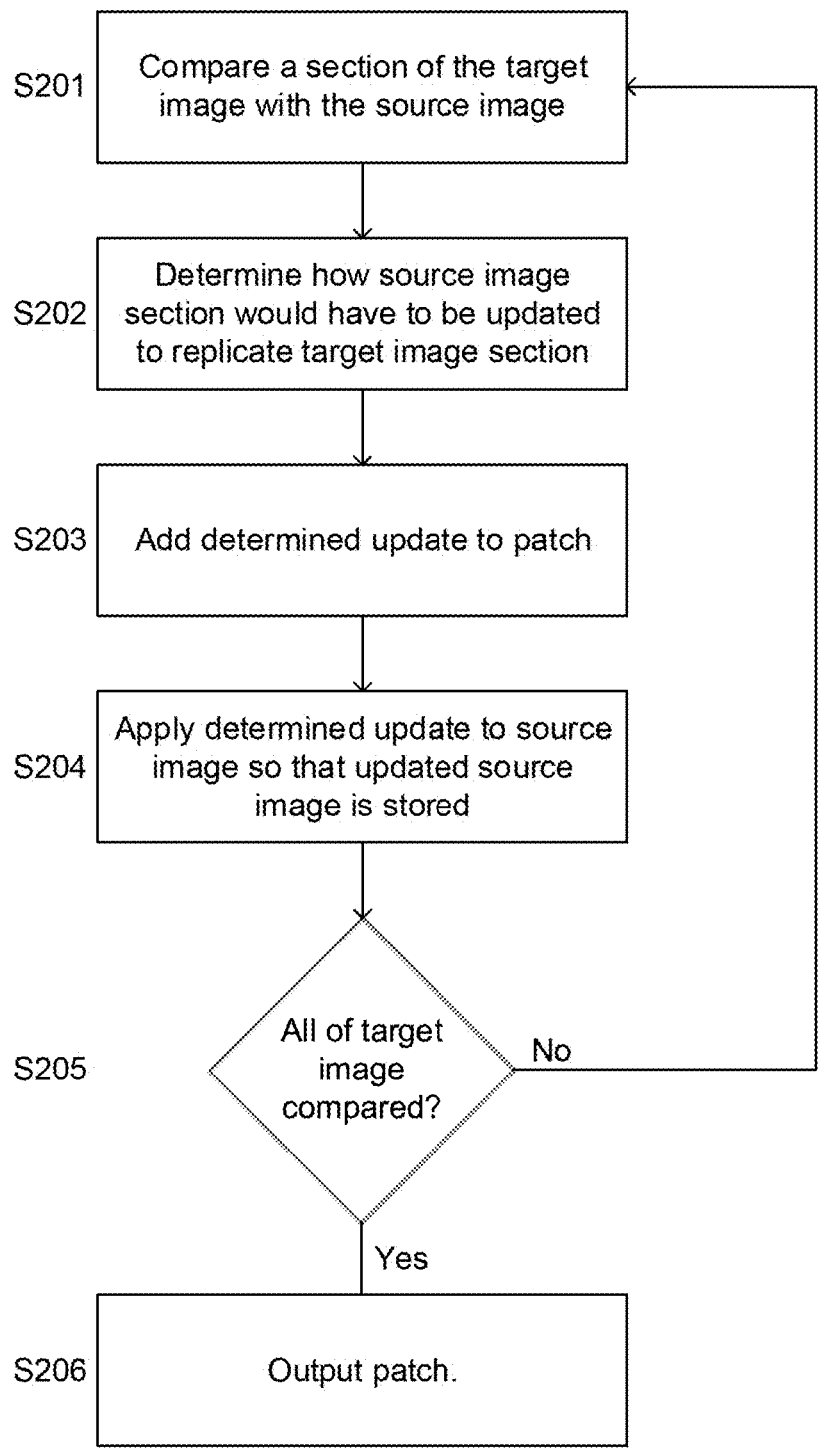
FIG. 2 shows a flowchart of a method for forming a patch.

The process shown in steps S201 to S204 of FIG. 2 repeats until the patch generator has worked through all of the target image (step S205). The resulting patch expresses the update as a series of progressive changes to the source image that will transform it into the target image.

Continually mutating the "reference" source image results in different updates being determined in step S202 compared with a technique that always compares the target image sections with the original source image. The resulting patch is different too: its update instructions reference a source image that is continually changing rather than one that is always the same. This has important implications for the device. If the patch generator always compares the target image sections with the original source image, the device is obliged to store the original source image intact as a reference until it has finished constructing its replacement. In contrast, the patch generation technique described above mimics what would happen at the device if it were to apply the patch in place, i.e. if the device updated the source image stored in its memory directly, rather than storing both the source image and an "in-progress" target image. This technique makes an "in situ" update of the source image at the device possible, reducing the amount of memory the device needs to implement a patch.

Figure 3:
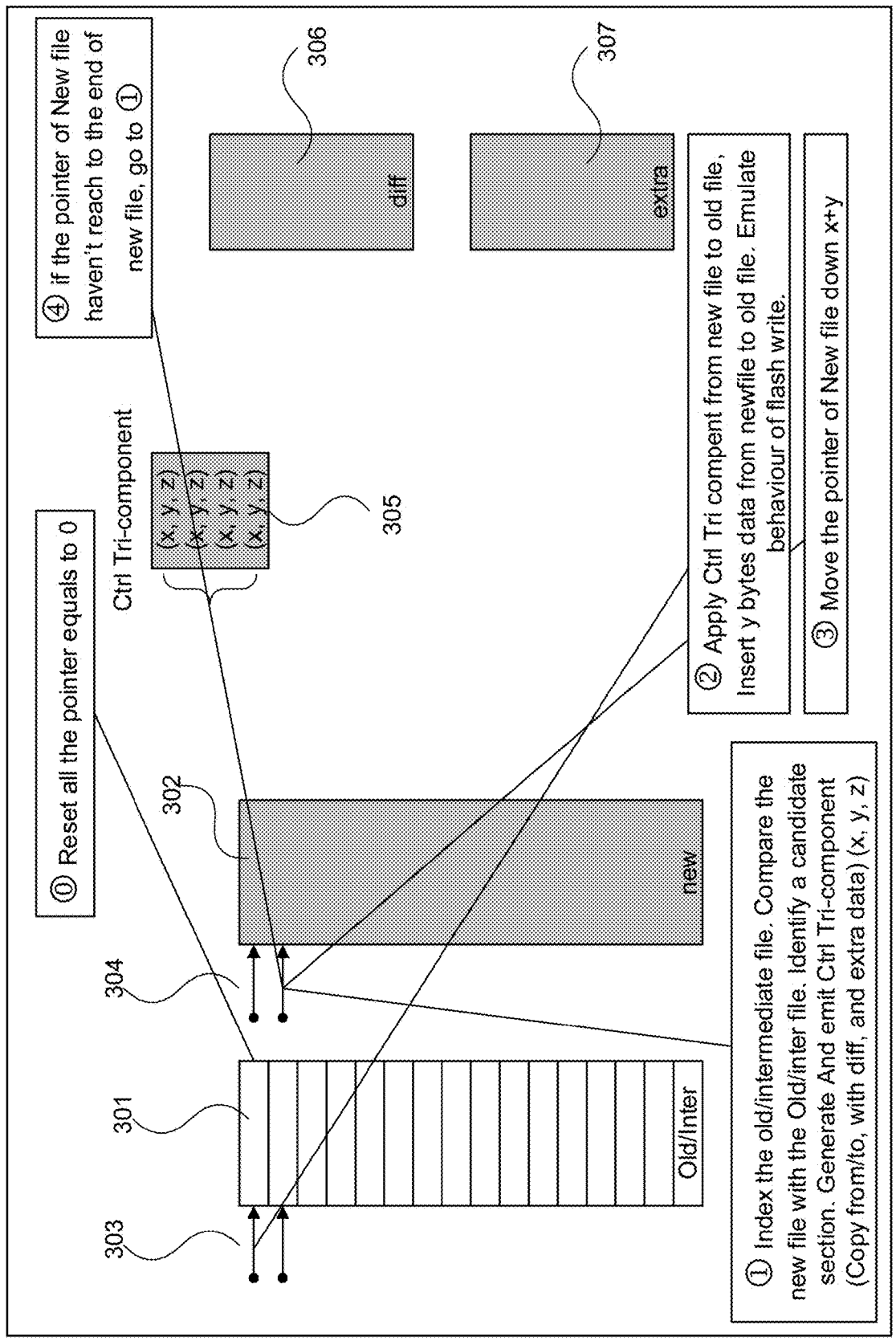
FIG. 3 illustrates an example of patch generation.

A more detailed example of an embodiment of patch generation is shown in FIG. 3. This figure shows a source image 301 and a target image 302. To start the process, the pointers 303 are set to zero for both the source image and the target image. The source image is indexed, preferably using a suffix array since this can be used to quickly locate every occurrence of a particular substring pattern within the source image. Any other suitable pattern matching technique could equally be used. A section of the target image is then compared with the source image to identify a candidate section that provides a good starting point for replicating the target image section. This comparison generates a so-called "Ctrl Tri-component" 306. The component is formed of three values: x, y and z. It may also be accompanied by "diff" and "extra" (306, 307 respectively). Together this data represents an instruction to the receiving device that "x" bytes of data should be copied from position "y" to position "z" by applying an alteration "diff" and adding extra bytes "e".

The Ctrl Tri-component is applied to the source image, changing it from the original image into an "intermediate" image. The pointer is then moved down by the appropriate number of bytes (i.e. the number of bytes that have been copied plus the number of extra bytes). The process then repeats until the pointer reaches the end of the file. The "source image" that is referenced by the patch generator is thus one that continually mutates, in emulation of the progressive transformation that will take place in the device.

The patch is formed from the Ctrl-Tri components, which represent a series of instructions to the receiving device. The instructions are sequential, and will progressively transform the source image into the target image when applied in order by the receiving device (as explained below). The patch is mostly empty so it compresses well for transmission over the air interface.

The reference source image is updated as the patch is generated to simulate the image that the receiving device will be working from as it progressively updates its own version of the source image. Sometimes there will be factors specific to how the device operates that will influence the version of the source image that device will have stored in memory when it implements a particular instruction in the patch. The patch generator preferably accounts for any such factors when it updates its own version of the source image. One example is the speed with which the device will write an update to its stored version of the source image. Some devices can only erase a block of memory at a time, so they store memory writes in an intermediate buffer until there is a block-worth of writes to be transferred to memory. Therefore, updates to the source image will be stored in the buffer for a time before they overwrite the original source image in the device's memory. To address this, the patch generator is preferably configured to emulate the typical flash programming cycle of the devices that the patch is intended for. The image updater may therefore delay updating its own version of the source image for the time that is expected to elapse between the device implementing that section of the patch and updating its own version of the source image.

Here is a worked example in which the source image and target image are as follows:
Source image: "abcdefghijklmnopqrstuvwxyz"
Target image: "abfghijkpqrstuvcde"

The process of generating the patch may derive the following instructions:
1. Copy 2 characters from offset 0
    Source is now "abcdefghijklmnopqrstuvwxyz" (unchanged)
2. Copy 6 characters from offset 5
    Source is now "abfghijkijklmnopqrstuvwxyz"
3. Copy 7 characters from offset 15
    Source is now "abfghijkpqrstuvpqrstuvwxyz"
4. Add 3 characters "cde" and finish
    Source is now "abfghijkpqrstuvcde", and matches the target Note that the instructions above have been simplified by excluding the diff aspect that would be carried out as part of the standard BSDiff algorithm.

Note also that in step 4, it was necessary to add the characters "cde" even though they were present in the original source image, because these characters were obliterated by one of the previous operations. The patch is constructed to permit such obliterations, which may occur during the process of the source being modified in-place towards the target.

The patch generator may also modify the technique described above if the target image is bigger than the source image. The patch generator preferably works through the target image in reverse order if the target is larger than the source image. The technique for generating the patch is thus the same as that described above, but the patch generator works from the end of the target image to the beginning, rather than the other way around. Without this treatment, the most-correlated parts of the target image and the source image would be overwritten before the progressive updates reached those sections. This would lead to larger patch sizes and less efficient use of the bandwidth available over the air interface.

The techniques described herein also lead to innovations at the device that receives the patch. It can now be configured to implement the patch in situ by progressively overwriting the source image that it has stored in memory.

Figure 4:
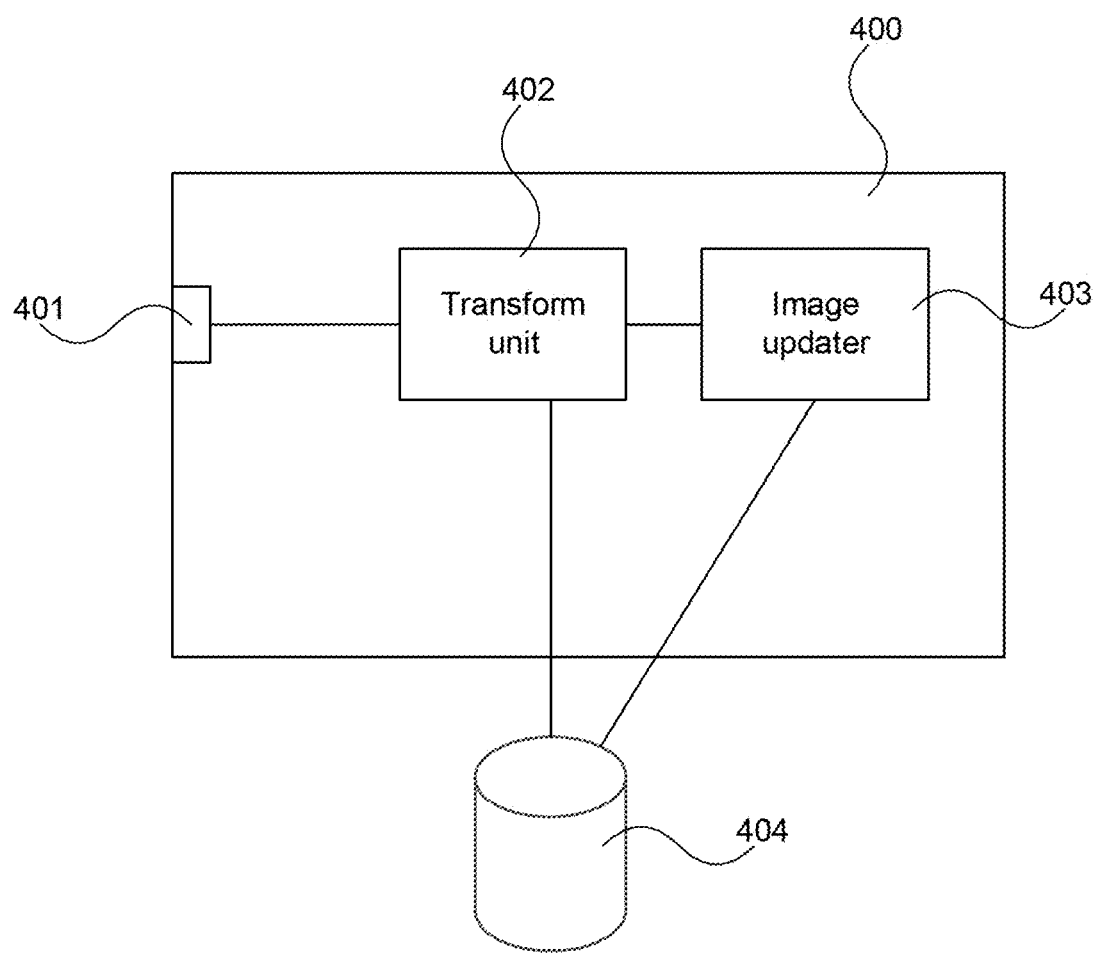
FIG. 4 shows an example of a program manager.

An example of a program manager 400 at a device is shown in FIG. 4. The program manager is shown illustratively as comprising a number of functional blocks, as with the patch generator of FIG. 1. In practice the program manager is likely to be implemented in software. The functional blocks shown in FIG. 4 may therefore be embodied by a single computer program stored on a non-transitory machine-readable storage medium. In other implementations the program manager of FIG. 4 could be implemented by a number of separate computer programs. FIG. 4 is not intended to define a strict division between different programs, procedures or functions in software. The program manager may be implemented wholly or partly by a processor acting under software control. (In other implementations, some or all of the functions of the program manager could be implemented wholly or partly in hardware.) In one implementation, the program manager may form part of the boot loader on a chip comprised in the device.

Figure 5:
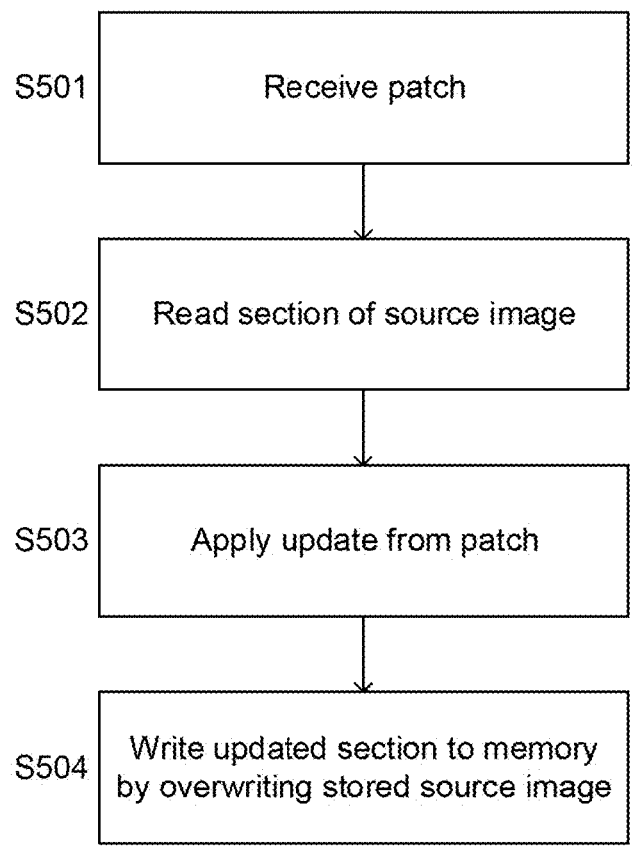
FIG. 5 shows a flowchart of a method for updating a source image.

The program manager (400) comprises a number of functional blocks including an input 401, a transform unit 402 and an image updater 403, with at least the transform unit and the image updater having access to a memory 404. The operations of these functional blocks will be described with reference to FIG. 5, which provides an overview of how the patch can be applied in situ at the device.

The process of applying the patch commences in step S501 when the input receives a patch and passes it to the transform unit 402. The device that comprises the program manager (400) suitably comprises an antenna, receive chain, demodulator, decoder, decompressor etc. so that the patch input into the program manager is the same as the patch that was output by the patch generator (assuming that the patch was transmitted and received successfully). In step S502 the transform unit starts to update the source image by reading the section that the first patch instruction relates to from memory. The transform unit updates that section of the source image by applying the instruction in the patch (step S503). That instruction might involve reading bytes from one location in the source image so that they can be written back to a different location, making some alteration to the read bytes before writing them back to memory and/or adding some extra bytes to the read bytes before they are written back to memory etc. The updated section is then written back to memory by the image updater 403 by overwriting at least part of the source image that is stored there already (step S504). In many instances, the section of the source image that was read from memory in step S504 will be overwritten as the updated section is written back to memory. In some devices the updated section may be written back to memory via a buffer (as described above).

One consequence of the program manager causing updated sections of the source image to be written directly back to the stored source image is that the device does not have to store both the original source image and an "in progress" version of the target image. Instead the device only stores the progressively updating version of the source image, which provides a useful memory saving. The program manager preferably implements the updates of the patch in the same order that they are presented in the patch, so that its stored version of the source image progressively updates in the way that was anticipated by the patch generator.

Although the description above refers to the patch being transmitted and received over a wireless connection, it should be understood that this is just one example of an application in which the techniques described herein can be beneficially employed. These techniques might equally be employed for generating patches that are exchanged via other communication means, including wired connections.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

What is claimed is:

1. A patch generator for generating a patch that expresses a series of updates to a source image that will transform the source image into a target image, the patch generator comprising a processor and a memory, the memory containing executable instructions which, when executed by the processor, cause the processor to:
   compare sections of the target image, in turn, with respective versions of the source image;
   determine the respective versions of the source image to be versions of the source image that the patch generator expects a device to be storing when it implements each update of the series of updates expressed by the patch;

compare each section of the target image with a respective version of the source image that the patch generator expects the device to be storing at the point when it implements an update corresponding to that section of the target image in the patch;

generate the series of updates for the patch based on the comparisons between the sections of the target image and the respective version of the source image;

identify a size of a buffer associated with a memory of a device for which the patch is intended; and delay updating the stored version of the source image in dependence on the identified buffer size.

2. The patch generator according to claim 1, wherein the executable instructions, when executed by the processor, further cause the processor to generate the patch to express the update as a series of progressive changes to the source image that will transform it into the target image.

3. The patch generator according to claim 1, wherein the executable instructions, when executed by the processor, further cause the processor to compare a section of the target image to the source image by:

searching the version of the source image that is expected to be stored by the device for a candidate section; and determining how that candidate section would have to be changed for it to replicate the section of the target image.

4. The patch generator according to claim 3, wherein the executable instructions, when executed by the processor, further cause the processor to generate the patch to include an instruction that defines how to change the candidate section to replicate the section of the target image.

5. The patch generator according to claim 1, wherein the executable instructions, when executed by the processor, further cause the processor to:

compare a section of the target image to a stored version of the source image;

determine how the stored version of the source image could be changed to replicate the section of the target image; and update the stored version of the source image in accordance with the determined change, the updated source image thereby becoming the stored version of the source image against which subsequent sections of the target image are compared.

6. The patch generator according to claim 1, wherein the executable instructions, when executed by the processor, further cause the processor to delay updating the stored version for a time that is dependent on a time that is expected to elapse between the device storing an updated section of the source image in the buffer and the device writing that updated section of the source image to the memory.

7. The patch generator according to claim 1, wherein the executable instructions, when executed by the processor, further cause the processor to:

determine if the target image is larger than the source image; and when it is determined that the target image is larger than the source image, compare sections of the target image in reverse order with a version of the source image.

8. A method for generating a patch that expresses a series of updates to a source image that will transform it into a target image, the method comprising:

comparing sections of the target image, in turn, with respective versions of the source image;

determining the respective versions of the source image to be versions of the source image that a device is expected to be storing when it implements each update of the series of updates expressed by the patch; and wherein comparing each section of the target image with a respective version of the source image comprises comparing that section of the target image with the respective version of the source image that the device is expected to be storing at the point when it implements an update corresponding to that section of the target image in the patch;

generating the series of updates for the patch based on the comparisons between the sections of the target image and the respective versions of the source image;

identifying a size of a buffer associated with a memory of a device for which the patch is intended; and delaying updating the stored version of the source image in dependence on the identified buffer size.

9. A non-transitory machine readable storage medium having stored thereon processor executable instructions implementing a method for generating a patch that expresses an update to a source image that will transform it into a target image comprising:

comparing sections of the target image, in turn, with respective versions of the source image;

determining the respective versions of the source image to be versions of the source image that a device is expected to be storing when it implements each update of the series of updates expressed by the patch; and wherein comparing each section of the target image with a respective version of the source image comprises comparing that section of the target image with the respective version of the source image that the device is expected to be storing at the point when it implements an update corresponding to that section of the target image in the patch;

generating the series of updates for the patch based on the comparisons between the sections of the target image and the respective versions of the source image;

identifying a size of a buffer associated with a memory of a device for which the patch is intended; and delaying updating the stored version of the source image in dependence on the identified buffer size.

* * * * *